(12) United States Patent
Kobayashi (10) Patent No.: US 7,379,620 B2
(45) Date of Patent: May 27, 2008

(54) IMAGE TAKING APPARATUS

(75) Inventor: Koji Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 743 days.

(21) Appl. No.: 10/983,642

(22) Filed: Nov. 9, 2004

(65) Prior Publication Data
US 2005/0099509 A1  May 12, 2005

(30) Foreign Application Priority Data
Nov. 10, 2003  (JP) ............................. 2003-380185

(51) Int. Cl.
*G06K 9/36* (2006.01)
(52) U.S. Cl. .................................... 382/284
(58) Field of Classification Search ............. 348/211.5, 348/335, 222.1, 221.1, 223.1, 39–50, 207.2, 348/207.99, 231.6, 231.2, 668, 704, 343–344, 348/211; 396/322, 323, 326; 382/284, 100, 382/162, 167, 274; 358/1.9, 115, 516–519, 358/521, 540, 461, 450, 296
See application file for complete search history.

(56) References Cited

U.S. PATENT DOCUMENTS 4,199,785 A * 4/1980 McCullough et al. ....... 348/704
6,226,035 B1 * 5/2001 Korein et al. ............... 348/335
6,963,375 B1 * 11/2005 Lundberg .................... 348/335
7,304,668 B2 * 12/2007 Ichikawa et al. ........ 348/223.1
2002/0005902 A1 * 1/2002 Yuen .......................... 348/211
2007/0019103 A1 * 1/2007 Lieberman et al. ......... 348/344
2007/0188650 A1 * 8/2007 Kobayashi et al. ......... 348/344

FOREIGN PATENT DOCUMENTS

JP      2002-156711 A     5/2002

* cited by examiner

*Primary Examiner*—Ishrat Sherali
(74) *Attorney, Agent, or Firm*—Birch, Stewart, Kolasch & Birch, LLP (57) ABSTRACT

An image taking apparatus according to the present invention has: a primary CCD section that receives a predetermined first part of object light focused by an image-taking optical system to produce a primary image signal; a secondary CCD section that has a dynamic range wider than that of the primary CCD section and receives a second part of the object light excluding the first part to produce a secondary image signal; an image signal processing circuit that produces image data based on a synthetic signal produced by synthesizing the primary image signal and the secondary image signal if the synthetic signal, rather than the primary image signal, is selected; and an information adding section that adds predetermined additional information to the image data if the image signal processing circuit produces the image data based on the synthetic signal.

3 Claims, 10 Drawing Sheets

IMAGE TAKING APPARATUS

BACKGROUND OF THE INVENTION

1. Field of the Invention

The present invention relates to an image taking apparatus that captures object light and produces image data representing an object image.

2. Description of the Related Art

One example of such image taking apparatus is a digital camera that captures object light with a solid-state imaging device and produces image data representing the object image. Such a digital camera has been popular for quite a few years. However, the charge coupled device (CCD), which is commonly used in the digital camera as the solid-state imaging device for capturing object light, has a disadvantage that the dynamic range for the quantity of object light is narrow compared with the silver-salt film. That is, if the quantity of object light exceeds the upper limit of the dynamic range for the quantity of light, the CCD, which outputs signals corresponding to the quantity of object light, becomes saturated and can output only fixed signals. On the other hand, the silver-salt film captures object light by changing the photosensitivity in accordance with the quantity of the object light. The silver-salt film also has a dynamic range for the quantity of light and becomes saturated if the object light is too intense and exceeds the upper limit of the dynamic range. However, the upper limit of the dynamic range of the CCD is lower than that of the silver-salt film. As a result, a picture printed based on the image data produced by the digital camera with such a CCD suffers the so-called whiteout in a bright part of the object image or the so-called blackout in a dark part of the object image. For example, a picture of a clear sky with clouds and a person in the shade of a tree may be poor in quality due to whiteout in the part of the clouds or blackout in the part of the person.

In recent years, there has been developed a technique as described below to overcome the above drawback of the CCD. According to this technique, one CCD is composed of an array of composite pixels, each of which is a pair of a primary pixel of high sensitivity and a secondary pixel of wide dynamic range. In the following description, the CCD composed of an array of such composite pixels will be referred to as a composite CCD, the part of the composite CCD which is composed of an array of such primary pixels will be referred to as a primary CCD section, and the part of the composite CCD which is composed of an array of such secondary pixels will be referred to as a secondary CCD section. According to this technique, dark object light of a small quantity of light is captured by the primary CCD section composed of primary pixels of high sensitivity. And bright light of a large quantity of light, which may make the primary CCD section saturated, is captured by the secondary CCD section composed of secondary pixels of wide dynamic range. The image data representing the object image is obtained by synthesizing the output signals from the primary CCD section and the secondary CCD section. In this way, the whiteout and the blackout described above can be prevented.

In a photo printing shop, when image data produced by the digital camera is received from a user asking for printing, the printer for producing pictures from the image data typically automatically performs an image correction processing, such as gradation correction, tone correction and white balance correction, on the image data. In the printer, data determined to represent an excessively bright image is regarded as a noise or the like and smoothed via the image correction processing. As a result, if the user asks for printing of a picture based on the image data representing an object image of a scene of a wide dynamic range produced by the high-performance digital camera with the composite CCD, the image data representing delicate gradations or the like of the bright object light captured by the composite CCD may be smoothed by the involuntary image correction processing, and the printed picture may be poor in quality due to whiteout or the like, as is conventional. That is, even if rich image data representing an object image of a scene of a wide dynamic range is obtained by the high-performance digital camera described above, part of the rich data may be wasted in printing.

There has been developed a printer used in photo printing shops that can appropriately inhibit an image correction processing, such as gradation correction, tone correction and white balance correction, of image data not to interfere with the intention of the user if the user has taken pictures by adjusting the shutter speed, the aperture or the like according to a particular intention.

As an example of the digital camera designed for such a printer, there has been proposed a digital camera that is provided with a typical CCD, has a user-selectable shooting mode, such as a manual mode and an exposure correction mode, in which the user can adjust the shutter speed or the aperture during photographing, and has a function of adding, to the image data obtained in such a shooting mode, correction inhibiting information that indicates that an image correction processing, such as gradation correction, tone correction and white balance correction, of the image data (for example, see Japanese Patent Laid-Open No. 2002-156711 (p. 4-9, FIG. 5)) is inhibited. For the image data with the correction inhibiting information obtained in such a digital camera, the printer inhibits the image correction processing of the image data in accordance with the correction inhibiting information.

It seems that the disadvantage of the printing can be avoided by applying the invention disclosed in Japanese Patent Laid-Open No. 2002-156711 to the digital camera with the composite CCD.

However, the digital camera disclosed in Japanese Patent Laid-Open No. 2002-156711 requires the user to perform some intentional manipulation of the digital camera, such as switching of the shooting mode, in order for the printer to inhibit an image correction processing, such as gradation correction, tone correction and white balance correction, of the image data obtained by photographing. Thus, it is difficult to apply the technique disclosed in Japanese Patent Laid-Open No. 2002-156711 to the high-performance digital camera that produces high-volume image data representing an image of a wide dynamic range regardless of the intention of the user.

In addition, the image processing of the high-volume image data obtained in the high-performance digital camera, which is performed by the printer, is not always desired to be inhibited. For example, if available image data disproportionately exists in a certain part of the dynamic range due to poor photographing, it is desirable that the image data obtained in the digital camera is effectively used by selecting the available data or performing an appropriate correction processing to make use of the available data. However, the technique disclosed in Japanese Patent Laid-Open No. 2002-156711 cannot handle such a situation.

While problems have been described by taking the digital camera as an example, these problems concern not only the digital camera but also other image taking apparatus that capture object light and produce image data representing the object image.

SUMMARY OF THE INVENTION

The present invention has been made in view of the above circumstances and provides an image taking apparatus that can effectively use rich image data representing an image of a wide dynamic range.

According to the present invention, there is provided an image taking apparatus, including:

an image-taking optical system that focuses object light from an object to form an image;

a primary image pick-up section that receives a predetermined first part of the object light focused by the image-taking optical system to produce a primary image signal;

a secondary image pick-up section that has a dynamic range wider than that of the primary image pick-up section and receives a second part of the object light excluding the first part to produce a secondary image signal;

an image signal synthesizing section that synthesizes the primary image signal and the secondary image signal to produce a synthetic signal;

a selector section that selects any one of the primary image signal and the synthetic signal;

an image data producing section that produces image data representing an image of the object based on the primary image signal if the selector section selects the primary image signal or produces image data representing an image of the object based on the synthetic signal if the selector section selects the synthetic signal; and an information adding section that adds predetermined additional information to the image data if the selector section selects the synthetic signal.

The image taking apparatus according to the present invention captures the object light with the primary image pick-up section and the secondary image-pick-up section and synthesizing the image signals from the respective image pick-up sections in the image signal synthesizing section, thereby producing rich image data representing an image of a wide dynamic range. Once such image data is produced, the image taking apparatus according to the present invention can add, to the image data, additional information indicating that a processing to enable appropriate use of the rich image data is to be performed. Thus, if the image data with the additional information produced in the image taking apparatus according to the present invention is input to the printer having a function of performing an internal processing in accordance with the additional information added to the image data, the printer performs the processing to enable appropriate use of the rich image data in accordance with the additional information. That is, the image taking apparatus according to the present invention can allow the printer having such a function to produce a picture by making use of the rich image data.

To be specific, in the image taking apparatus according to the present invention, the additional information added to the image data by the information adding section may be correction inhibiting information that indicates that a predetermined image correction of the image data is inhibited, or attribute information that indicates that the image data is image data produced based on the synthetic signal.

In the case where the additional information is the correction inhibiting information, the printer having received the image data to which the correction inhibiting information is added by the image taking apparatus according to the present invention inhibits the image correction processing, such as gradation correction, tone correction and white balance correction, of the image data in accordance with the correction inhibiting information and prints a picture by using the rich image data as it is. In the case where the additional information is the attribute information, the printer having received the image data to which the attribute information is added by the image taking apparatus according to the present invention produces a picture by performing, on the image data, the image correction processing to enable appropriate use of the rich image data in accordance with the attribute information. That is, in any case, with the image taking apparatus according to the present invention, a picture can be printed by effectively using the rich image data.

As described above, according to the present invention, there is provided an image taking apparatus that can effectively use rich image data representing an image of a wide dynamic range.

DETAILED DESCRIPTION OF THE INVENTION

In the following, embodiments of the present invention will be described with reference to the drawings.

Figure 1:
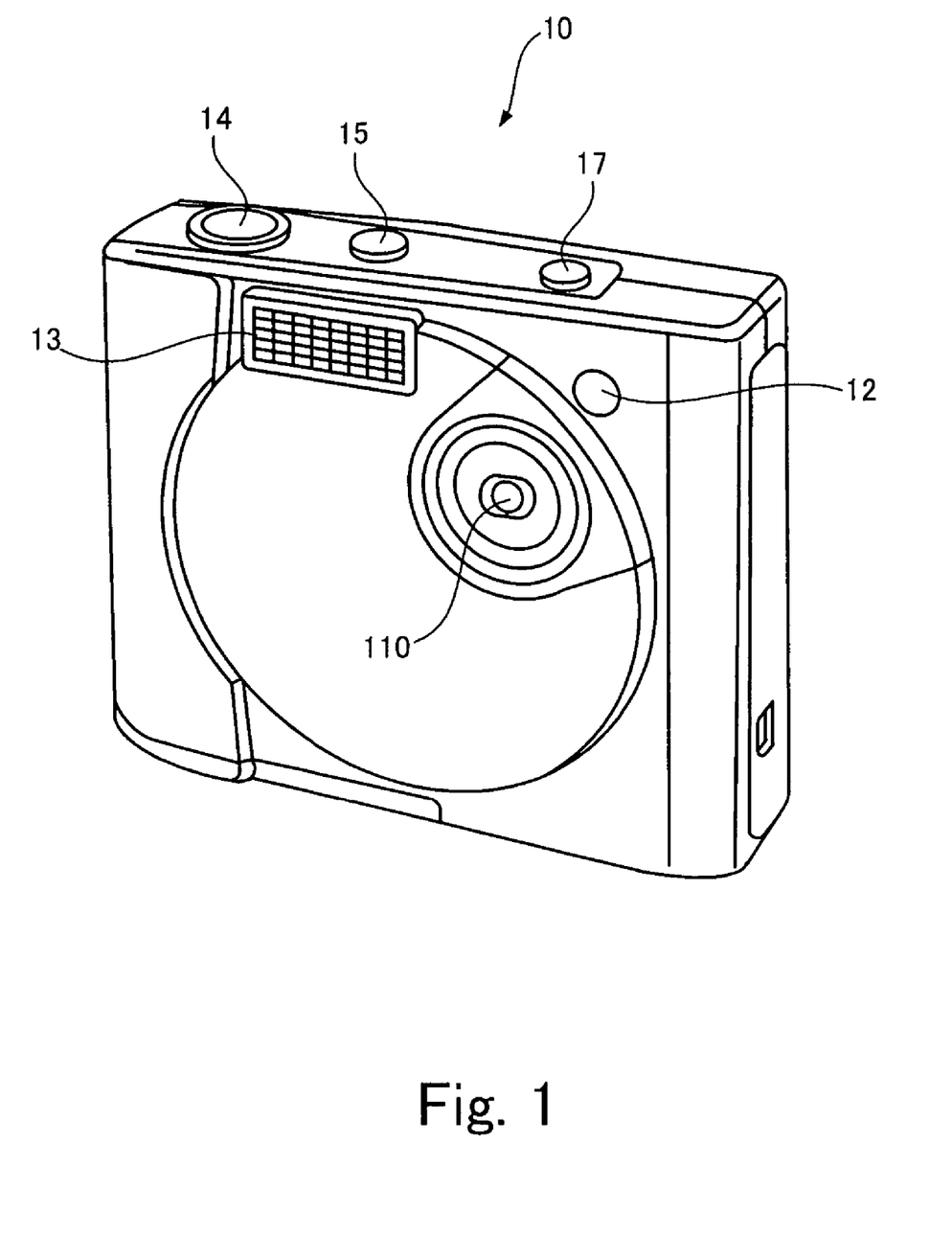
FIG. 1 is a perspective view of a digital camera according to an embodiment of the present invention, viewed from the front with a lens attached.
Figure 2:
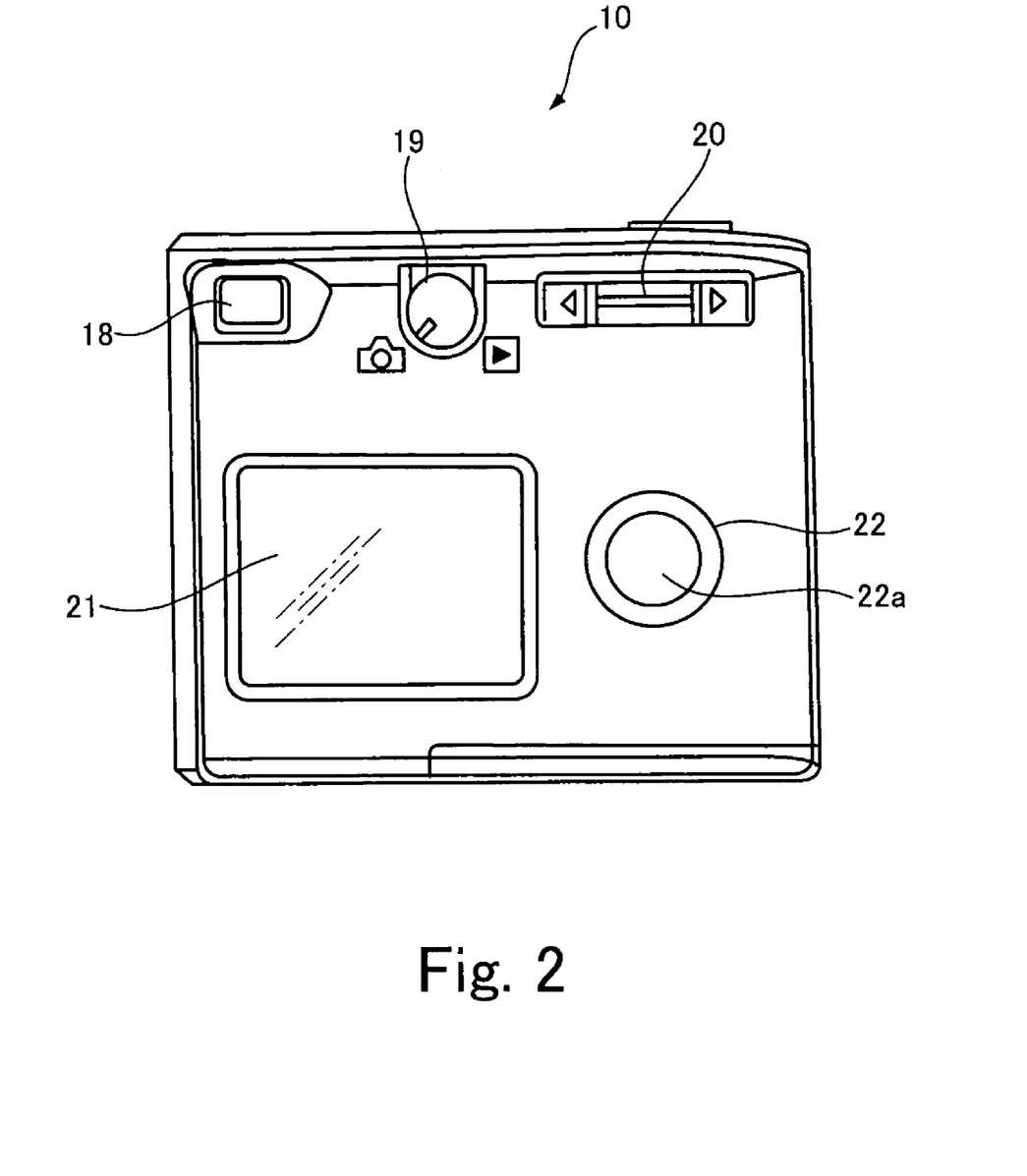
FIG. 2 is a back view of the digital camera according to the embodiment of the present invention.

FIG. 1 is a perspective view of a digital camera according to an embodiment of the present invention, viewed from the front with a lens attached. FIG. 2 is a back view of the digital camera according to this embodiment of the present invention.

A digital camera 10 shown in FIG. 1 has an image pick-up lens 110 including a zoom lens 111 and focusing lens 112 that will be described later, a finder window 12, and a flash lamp 13 on the front face thereof.

On the top face of the digital camera 10, there are provided a release switch 14, a power switch 15, and a flash lamp switch 17, which is a manipulating element for switching between a normal photography mode and a flash photography mode.

On the back face of the digital camera 10, there are provided a finder 18, a status switch 19 for switching the digital camera 10 between a photographing status and a review status, a zoom switch 20, which is a manipulating element for zoom operation, and a liquid crystal display unit 21 for displaying a reproduced static image or a through image. In addition, on the back face of the digital camera 10, there is provided a mode dial 22 for switching the shooting mode of the digital camera 10 in the photographing status among a sequential shooting mode for taking sequential images of a moving object, a sensitive shooting mode for taking an image of an object in a small quantity of light, a long shutter mode for long-exposure photography, and a normal shooting mode for taking an image of a person or the like. The mode dial 22 has a mode display section 22a, and a user manipulates the mode dial 22 by seeing the mode display section 22a to set the digital camera 10 at a desired shooting mode.

Figure 3:
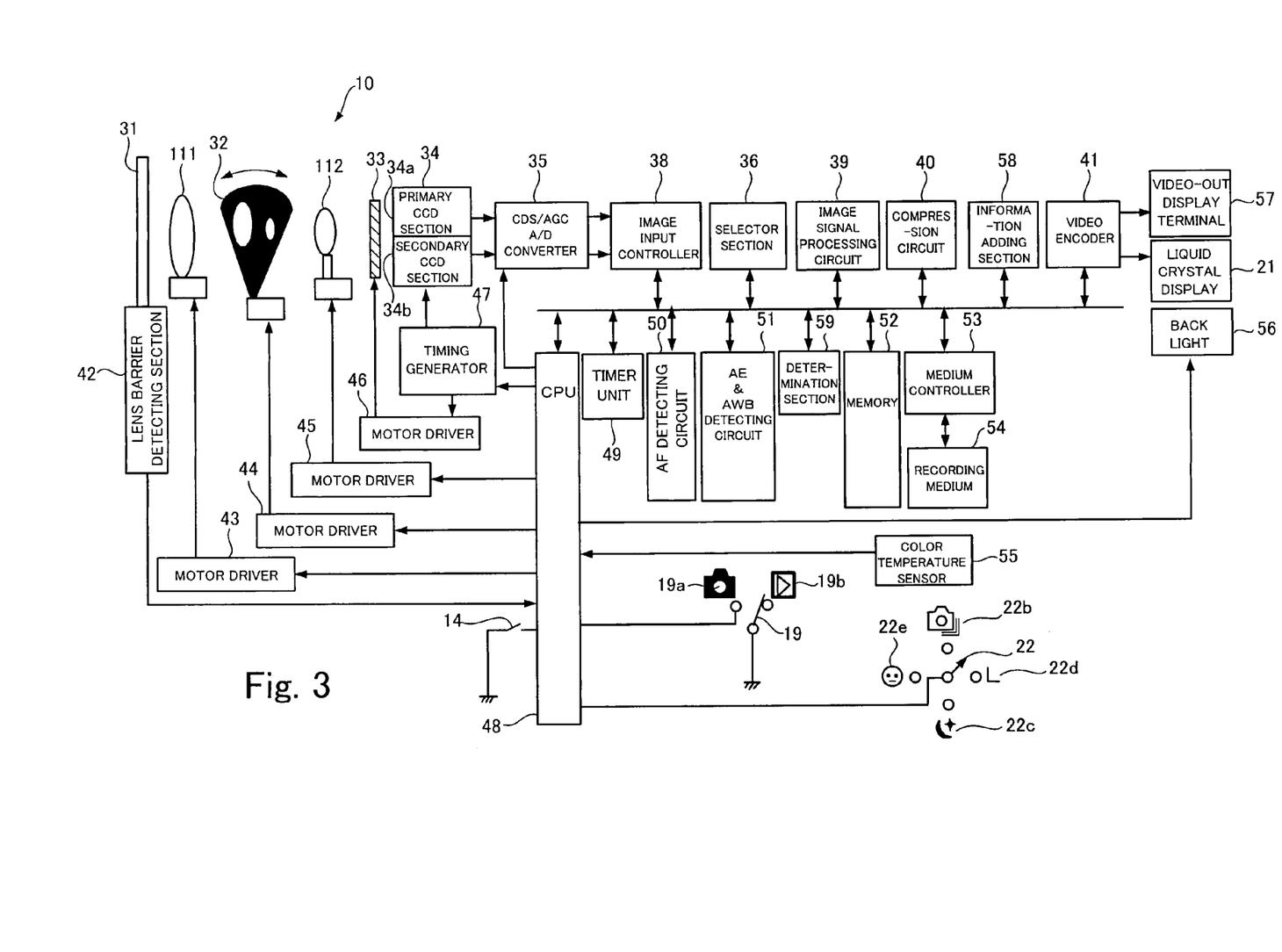
FIG. 3 is a functional block diagram of the digital camera shown in FIGS. 1 and 2.

FIG. 3 is a functional block diagram of the digital camera shown in FIGS. 1 and 2.

A memory 52 stores a control program for the digital camera 10 and an activation program for the control program. When the user presses the power switch 15 (see FIG. 1) down and the digital camera 10 is supplied with power, a CPU 48 accesses the memory 52 to control the operation of the digital camera 10 in accordance with the control program written in the memory.

In the digital camera 10 according to this embodiment, during the time when electric power is supplied to the digital camera, an image of an object formed on a composite CCD 34 via a image-taking optical system including the zoom lens 111, an iris 32, the focusing lens 112 and a mechanical shutter 33 is displayed on the liquid crystal display unit 21 as a through image. Here, the image-taking optical system is an example of an "image-taking optical system" according to the present invention.

In the following, there will be described components of the digital camera 10 and an operation of the digital camera 10 from the time when object light is launched into the camera via the image-taking optical system until a through image is displayed on the liquid crystal display unit 21.

When power is supplied to the digital camera 10, a lens barrier 31, which is provided for protecting the image-taking optical system, opens. The opening of the lens barrier 31 is detected by a lens barrier detecting section 42, and the CPU 48 receives the detection information. Then, in accordance with an instruction from the CPU 48, the lenses described above are driven by their respective motor drivers to their respective predetermined initial positions. At the same time, the mechanical shutter 33 is driven and opened by a mechanical-shutter motor driver 46. Here, the mechanical shutter 33 is provided for preventing optical smear from occurring in reading an analog image signal from the composite CCD 34.

The digital camera 10 has a timer unit 49, which monitors the elapsed time from the time when power supply to the digital camera 10 is started. If the elapsed time monitored by the timer unit 49 exceeds a predetermined time without transmission of the detection information indicating the opening of the lens barrier 31 from the lens barrier detecting unit 42 to the CPU 48, the CPU 48 assumes that a malfunction occurs in the lens barrier 31, makes the liquid crystal display unit 21 display an error message indicating the malfunction and stops the operation of the digital camera 10.

Here, the time monitored by the timer unit 49 may be used not only for detecting a malfunction in the lens barrier 31 but also for detecting a malfunction in other components in the optical system, such as the mechanical shutter 33, lenses, iris 32, for example.

The object light forms an image on the composite CCD 34 via the image-taking optical system described above. The composite CCD 34 is composed of a primary CCD section 34a having an array of primary pixels with a relatively high sensitivity and a secondary CCD section 34b having an array of secondary pixels with a relatively wide dynamic range. Here, the primary CCD section 34a is an example of a "primary image pick-up section" according to the present invention, and the secondary CCD section 34b is an example of a "secondary image pick-up section" according to the present invention.

Here, the operation of each CCD section depends on whether a selector section 36 selects a first mode, in which only the primary pixels of the primary CCD section 34a receive the object light forming the image on the composite CCD 34, or a second mode, in which both the primary pixels of the primary CCD section 34a and the secondary pixels of the secondary CCD section 34b receive the object light. According to this embodiment, the selector section 36 selects the first mode until the user presses the release switch 14 down and starts photographing. The second mode and an operation of the selector section 36 during photographing will be described later.

Once the selector section 36 selects the first mode, a timing generator 47 drives the primary CCD section 34a in response to the instruction from the CPU 48. Then, the object light forming an image on the composite CCD 34 is photo-electrically converted by the primary CCD section 34a at a predetermined frame rate, and the resulting analog image signal is output from the primary CCD section 34a.

The analog image signal output from the primary CCD section 34a is converted into a digital image signal by an A/D converter 35, which doubles as an amplifier. In the following description, the digital image signal obtained by the A/D converter 35 converting the analog image signal from the primary CCD section 34a will be referred to as a primary digital image signal. On the other hand, a digital image signal obtained by the A/D converter 35 converting the analog image signal from the secondary CCD section 34b described later will be referred to as a secondary digital image signal.

The primary digital image signal described above is stored in the memory 52 by an image input controller 38.

Then, an image signal processing circuit 39 reads the primary digital image signal from the memory 52 and performs a predetermined image processing on the digital image signal, thereby completing the image data representing the object image. An operation of the image signal processing circuit 39 during photographing will be described later.

The image data is converted into a video signal by a video encoder 41, and the video signal is introduced to the liquid crystal display unit 21. The video signal from the video encoder 41 is also introduced to a video-out display terminal 57, which is provided to supply the video signal to an external image display device (not shown).

The liquid crystal display unit 21 is illuminated from the interior of the digital camera 10 by a back light 56 controlled by the CPU 48, and thus, the through image based on the video signal is displayed on the liquid crystal display unit 21.

If the user changes the direction of the digital camera 10 in this state, the composition of the through image displayed on the liquid crystal display unit 21 changes. In addition, if the user manipulates the zoom switch 20 (see FIG. 2), a zoom-lens motor driver 43 drives the zoom lens 111 in response to the manipulation, thereby performing zooming.

Now, an operation of the digital camera 10 during photographing will be described.

The status switch 19 has a marking 19a representing the photographing status and a marking 19b representing the review status. If the status switch 19 is set at the marking 19a representing the photographing status, the digital camera 10 enters the photographing status. Then, the user manipulates the mode dial 22 while seeing the mode display section 22a of the mode dial 22 (see FIG. 2) and selects any of a mark 22b representing the sequential shooting mode, a mark 22c representing the sensitive shooting mode, a mark 22d representing the long-shutter mode and a mark 22e representing the normal shooting mode, thereby setting the digital camera 10 to a desired shooting mode.

If the shooting mode of the digital camera 10 is set, by the mode dial 22, to any of the sequential shooting mode, the long-shutter mode and the sensitive shooting mode, the selector section 36 selects the first mode, in which only the primary pixels of the primary CCD section n34 receive the object light forming the image on the composite CCD 34. If the shooting mode of the digital camera 10 is set to the normal shooting mode, the selector section 36 selects the second mode, in which both the primary pixels of the primary CCD section 34a and the secondary pixels of the secondary CCD section 34b receive the object light. Such selection by the selector section 36 is performed because the image data is inadequately produced if it is based on both the primary and secondary digital image signals generated by both the primary and secondary pixels receiving the object light in the sequential shooting mode, the long-shutter mode and the sensitive shooting mode, as described later with reference to another drawing. The following description will be made assuming that the shooting mode is the normal shooting mode, and the selector section 36 has selected the second mode. Here, the result of selection by the selector section 36 is transmitted to the CPU 48, a determination section 59 and the image signal processing circuit 39.

In this state, if the user presses the release switch 14 halfway down and holds it (this state will be referred to as a halfway pressed state, hereinafter) when an image of a desired composition is obtained, an AF detection circuit 50 detects focus information about the image, and an AE & AWB detection circuit 51 detects brightness information and white balance information about the image. In response to an instruction from the CPU 48 based on these pieces of information, a focusing-lens motor driver 45 drives the focusing lens 112, and an iris motor driver 44 drives the iris 32, thereby achieving focusing and exposure adjustment.

Then, if the user further presses the release switch 14 from the halfway pressed state (this state will be referred to as a fully pressed state, hereinafter), the image is taken.

Once the release switch 14 is fully pressed down, in response to an instruction from the CPU 48 based on the selection result (the second mode is selected in the description here) transmitted from the selector section 36, the timing generator 47 drives both the primary CCD section 34a and the secondary CCD section 34b. Then, the primary pixels of the primary CCD section 34a and the secondary pixels of the secondary CCD section 34b receive the light, the analog image signals output from the CCD sections are converted into digital image signals by the A/D converter 35, and the digital image signals are stored in the memory 52 by the image input controller 38.

In accordance with the selection result (the second mode is selected in the description here) transmitted from the selector section 36, the determination section 59 reads from the memory 52 the secondary digital image signal obtained by the secondary CCD section 34b receiving the light and determines, based on the secondary digital image signal, whether the current photographed scene has a wide dynamic range which cannot be represented by only the primary pixels but can be represented by the primary and secondary pixels. Here, the determination section 59 is an example of a "determination section" according to the present invention. Details of the determination by the determination section 59 will be described later. The result of the determination by the determination section 59 is transmitted to the image signal processing circuit 39.

If the determination result transmitted from the determination section 59 suggests that the current photographed scene has a wide dynamic range, the image signal processing section 39 reads both the primary digital image signal and the secondary digital image signal from the memory 52. If the determination result transmitted from the determination section 59 suggests that the current photographed scene does not have a wide dynamic range, the image signal processing section 39 reads only the primary digital image signal from the memory 52.

In the case where the image signal processing circuit 39 reads only the primary digital image signal from the memory 52, the image signal processing circuit 39 performs a predetermined image signal processing on the primary digital image signal to complete the image data representing the object image of the current photographed scene. In the case where the image signal processing circuit 39 reads both the primary digital image signal and the secondary digital image signal from the memory 52, the image signal processing circuit 39 synthesizes the primary and secondary digital image signals to produce a synthetic digital image signal, and performs a predetermined image signal processing on the synthetic digital image signal to complete the image data representing the object image of the current photographed scene. Details of the image signal processing by the image signal processing circuit 39 will be described later. The image data completed by the image signal processing circuit 39 is temporarily stored in the memory 52.

As described above, according to this embodiment, whether to produce the image data representing the object image of the current photographed scene based on the primary digital image signal or the synthetic digital image signal depends on the result of the processing by the selector section 36 and the determination section 59. That is, the selector section 36 and the determination section 59 constitute an example of a "selector section" according to the present invention. In addition, the image signal processing circuit 39 is an example of an "image data producing section" according to the present invention.

The image data produced through the image signal processing in the image signal processing circuit 39 is compressed in a compression circuit 40, and thus, compressed image data is produced.

In the digital camera 10 according to this embodiment, in the case where the compressed image data is produced based on the synthetic digital image signal, an information adding section 58 adds to the compressed image data gradation correction inhibiting information, tone correction inhibiting information and white balance correction inhibiting information that inhibit gradation correction, tone correction and white balance correction, respectively, of the compressed image data. Thus, for example, if the compressed image data with such correction inhibiting information produced by the digital camera 10 is passed to a printer capable of appropriately inhibiting gradation correction, tone correction and white balance correction in accordance with the correction inhibiting information, the printer inhibits gradation correction, tone correction and white balance correction of the image data obtained by expansion of the compressed image data in accordance with the correction inhibiting information. That is, the digital camera 10 according to this embodiment can allow the printer having such a function described above to effectively use rich image data representing an object image of a scene of a wide dynamic range to produce a photographic print thereof.

On the other hand, according to this embodiment, in the case where the compressed image data is produced based on only the primary digital image signal, the information adding section 58 adds to the compressed image data gradation correction permitting information, tone correction permitting information and white balance correction permitting information that permit gradation correction, tone correction and white balance correction, respectively, of the image data obtained by expansion of the compressed image data. If the printer described above receives the compressed image data with such correction permitting information, the printer performs gradation correction, tone correction and white balance correction on the image data in accordance with the correction permitting information.

In addition, the digital camera 10 according to this embodiment has a color temperature sensor 55 that detects the color temperature of the object image. The digital camera 10 detects the color temperature of the object image being photographed, produces color temperature information indicating the color temperature and appropriately adds the color temperature information to the compressed image data. If such correction permitting information as described above is added to the image data, for example, the printer uses the color temperature information for image correction, such as tone correction.

The compressed image data with the correction inhibiting information or correction permitting information described above is recorded in a recording medium 54 by a medium controller 53.

A configuration and an operation of the digital camera 10 according to this embodiment have been generally described above. In the following, a configuration of the composite CCD 34, details of the signal processing in the image signal processing circuit 39 and the like will be described specifically.

Figure 4:
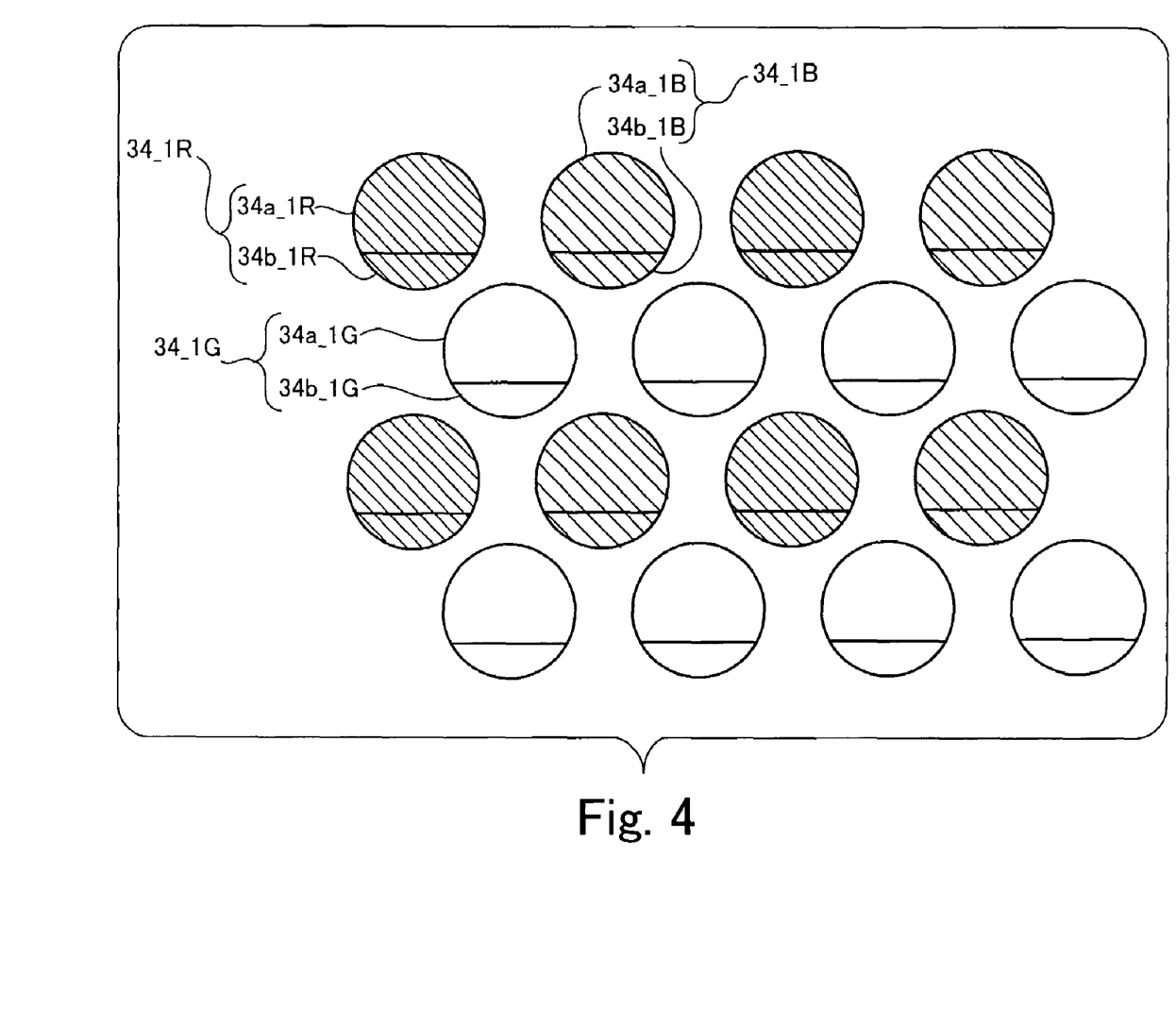
FIG. 4 is a schematic view of a composite CCD shown in FIG. 3.

First, a configuration of the composite CCD 34 will be described.

FIG. 4 is a schematic view of the composite CCD 34 shown in FIG. 3.

FIG. 4 shows a honeycomb array of composite pixels 34_1R, 34_1G and 34_1B of red (R), green (G) and blue (B), respectively, and the composite pixel 34_1R has a primary pixel 34a_1R and a secondary pixel 34b_1R, the composite pixel 34_1G has a primary pixel 34a_1G and a secondary pixel 34b_1G, and the composite pixel 34_1B has a primary pixel 34a_1B and a secondary pixel 34b_1B. Such a honeycomb array enables the composite pixels 34_1R, 34_1G and 34_1B to be arranged with a high density.

According to this embodiment, the primary CCD section 34a shown in FIG. 3 is composed of the primary pixels 34a_1R, 34a_1G and 34a_1B of red (R), green (G) and blue (B), respectively, and the secondary CCD section 34b is composed of the secondary pixels 34b_1R, 34b_1G and 34b_1B.

The primary pixels 34a_1R, 34a_1G and 34a_1B have a high sensitivity and a light-receiving surface area about three times as large as that of the secondary pixels 34b_1R, 34b_1G and 34b_1R. The secondary pixels 34b_1R, 34b_1G and 34b_1B have a lower sensitivity than the primary pixels 34a_1R, 34a_1G and 34a_1B and a wider dynamic range than the primary pixels 34a_1R, 34a_1G and 34a_1R. As a result, the primary CCD section 34a composed of the primary pixels 34a_1R, 34a_1G and 34a_1B has a high sensitivity, and the secondary CCD section 34b composed of the secondary pixels 34b_1R, 34b_1G and 34b_1B has a wide dynamic range.

The primary CCD section 34a and the secondary CCD section 34b each receive the object light and photo-electrically convert the object light into analog image signals. The analog image signals are converted into digital signals, and the digital signals are subject to an image signal processing described later in the image signal processing circuit 39 shown in FIG. 3.

Figure 5:
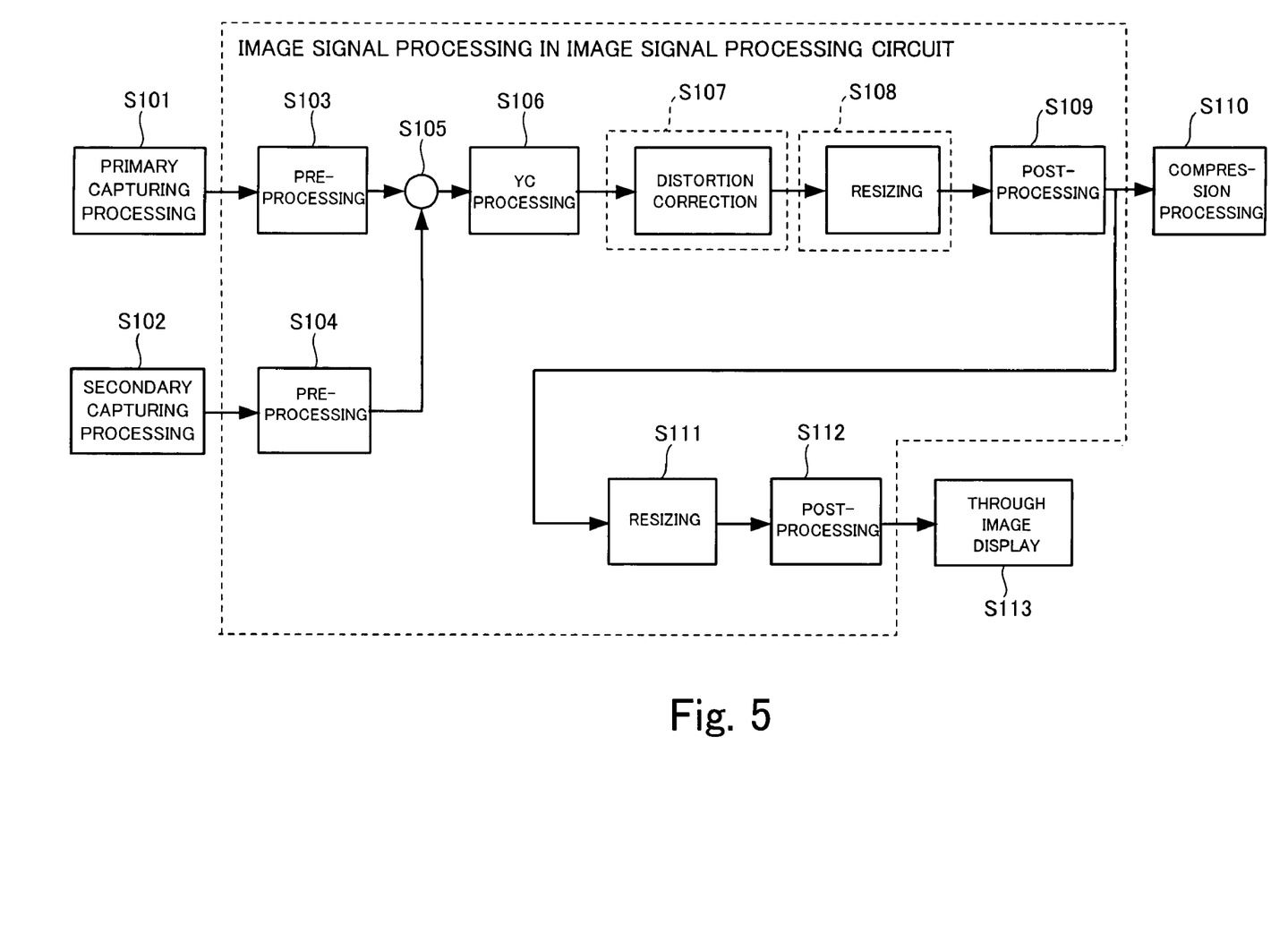
FIG. 5 is a diagram for illustrating an image signal processing performed in an image signal processing circuit shown in FIG. 3.

FIG. 5 is a diagram for illustrating an image signal processing performed in the image signal processing circuit 39 shown in FIG. 3.

In the following, the image signal processing will be described with reference to FIG. 5.

In FIG. 5, the procedure from the reception of the object light by the primary CCD section 34a shown in FIGS. 3 and 4 until the output of the primary digital image signal from the A/D converter 35 shown in FIG. 3 is shown as a primary capturing processing (step S101). Similarly, as for the secondary CCD section 34b shown in FIGS. 3 and 4, a procedure similar to the primary capturing processing (step S101) is shown as a secondary capturing processing (step S102). The image signal processing in the image signal processing circuit 39 shown in FIG. 3 is performed on the primary digital image signal obtained by the primary capturing processing (step S101) and the secondary digital image signal obtained by the secondary capturing processing (step S102). In the description herein, it is assumed that the selector section 36 shown in FIG. 3 selects the second mode, in which both the primary pixels of the primary CCD section 34a and the secondary pixels of the secondary CCD section 34b receive the object light, and both the primary capturing processing (step S101) and the secondary capturing processing (step S102) are performed.

The primary digital image signal and the secondary digital image signal are subject to preprocessings (steps S103 and S104) required for a YC processing described later. The preprocessings (steps S103 and S104) include various kinds of corrections, such as a shading correction. For example, a shading correction performed in these steps is as described below. When object light passes through an image-taking optical system including a lens and the like, the object light passing through peripheral areas is dark compared with the light passing near the central axis of the image-taking optical system. Thus, for example, if uniform white object light is transmitted to plural CCDs via the image-taking optical system, the CCDs output varied image signals despite the uniform object light. The shading correction is to correct for such a variation among the image signals by multiplying the image signals by a predetermined correction coefficient.

The preprocessed primary digital image signal and the preprocessed secondary digital image signal are synthesized depending on the determination result transmitted from the determination section 59 shown in FIG. 3 (step S105).

Specifically, if the determination result suggests that the current photographed scene is not a scene of a wide dynamic range, the synthesis is not performed, and only the primary digital image signal proceeds to the following processing. If the determination result suggests that the current photographed scene is a scene of a wide dynamic range, the primary digital image signal and the secondary digital image signal are synthesized, and the resulting synthetic digital image signal proceeds to the following processing.

Then, the primary digital image signal or the synthetic digital image signal is subject to a YC processing (step S106). In this step, the primary digital image signal or the synthetic digital image signal, which represents the object image by the densities of the three colors R, G and B, is converted into a YC image signal, which represents the object image by brightness (Y) and color (C).

In addition, if a distortion is found in the image represented by the YC image signal, a distortion correction for the distortion is performed (step S107). Here, the distortion correction (step S107) and a resizing processing described below (step S108) shown in FIG. 5 are surrounded by dot lines, because the steps are performed as required.

In the resizing processing (step S108), the YC image signals, each of which is composed of the Y signal and C signal for one pixel, are appropriately thinned out as required and reduced in size.

Furthermore, the YC image signal having been subject to the resizing processing (step S108) is subject to a postprocessing, such as a contour correction processing, which is to sharpen the contour of a human figure in the object image represented by the YC image signals (step S109).

The YC image signal having been subject to the processings up to step S109 described above is referred to as image data representing the object image. The image data is subject to a compression processing (step S110) and then stored in the recording medium 54 shown in FIG. 3.

Now, an image processing to display the through image on the liquid crystal display unit 21 will be described below. As described above, until the user presses the release switch 14 down after the digital camera 10 is powered on, the selector section 36 selects the first mode, in which only the primary pixels of the primary CCD section 34a receive the object light. Therefore, the primary digital image signal proceeds from the synthesis processing (step S105) to the following processings, and the primary digital image signal is subject to the YC processing (step S106) and the later processings to form the image data. Then, a further resizing processing (step S111) and a post processing (step S112), such as a contour correction processing, are performed on the image data to adjust the image data to the liquid crystal display unit 21 that is typically small. The image represented by the image data having been subject to the processings described above is displayed on the liquid crystal display unit 21 as a through image (step S113).

This is the end of the description of the image signal processing shown in FIG. 5.

In the following, there will be described the dynamic range of the object image represented by the image data produced based on the synthetic digital image signal generated by synthesizing the primary digital image signal and the secondary digital image signal. In the following, for simplicity, the dynamic range of the object image represented directly by the synthetic digital image signal that is yet to be subject to the processings following the synthesis processing (step S105) in FIG. 5 will be described, for example.

Figure 6:
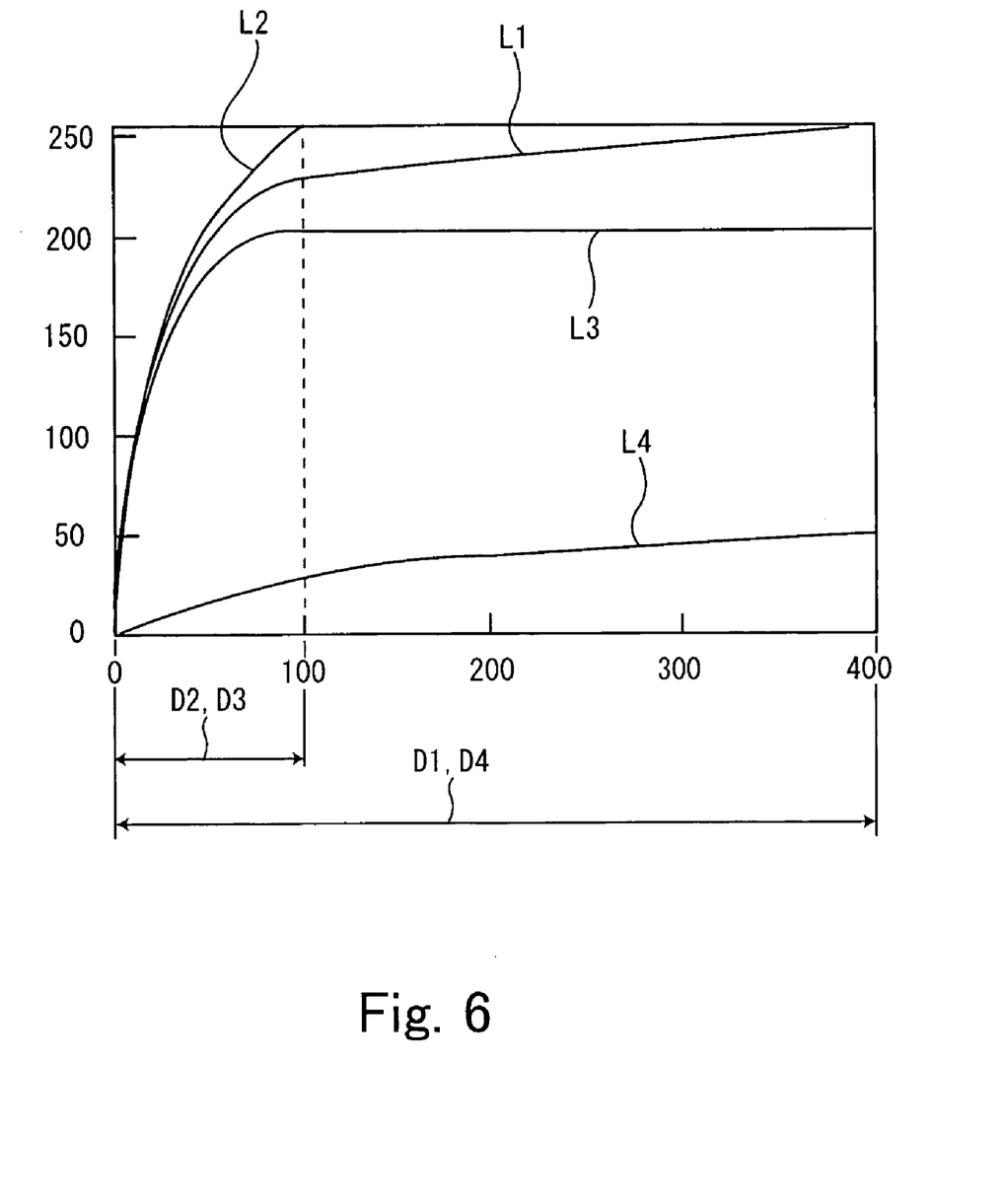
FIG. 6 is a graph showing a dynamic range of an object image represented by a synthetic digital image signal.

FIG. 6 is a graph showing a dynamic range of an object image represented by a synthetic digital image signal.

In the graph shown in FIG. 6, the horizontal axis indicates a value concerning the quantity of object light, and the vertical axis indicates a value concerning the gradation of an image representing the quantity of light. The value on the horizontal axis is a relative value determined on the assumption that the quantity of light with which the output of a conventional CCD is saturated is 100. The value on the vertical axis indicates the gradation of the image represented by various quantities of light indicated by the digital image signals having been subject to the preprocessing (step S103 or S104) shown in FIG. 5. Furthermore, in the graph shown in FIG. 6, in addition to a line L1 for a synthetic digital image signal, a line L2 for a conventional digital image signal obtained when light is incident on a conventional CCD, a line L3 for a primary digital image signal, and a line L4 for a secondary digital image signal are shown for the sake of comparison.

As described above, in the graph shown in FIG. 6, the quantity of light at the time when the line L2 for the conventional digital image signal reaches saturation, which is indicated on the horizontal axis, is 100, and the value 100 corresponds to a dynamic range D2 for the conventional digital image signal. Since the line L3 for the primary digital image signal reaches saturation with substantially the same quantity of light as the line L2, a dynamic range D3 for the primary digital image signal also corresponds to 100, as with the dynamic range D2 of the conventional digital image signal.

Referring to the vertical axis, the line L4 for the secondary digital image signal is lower than the other lines L1, L2 and L3 in the graph. This means that the sensitivity of the secondary CCD section 34b shown in FIG. 3 to the quantity of light is lower than that of the primary CCD section 34a. Besides, the line L4 for the secondary digital image signal reaches saturation with the quantity of light of about 400. That is, in the example shown in FIG. 6, a dynamic range D4 for the secondary digital image signal is four times as wide as the dynamic range D2 for the conventional digital image signal or the dynamic range D3 for the primary digital image signal.

The line L1 for the synthetic digital image signal obtained by synthesizing the primary digital image signal and the secondary digital image signal does not reach saturation even if the quantity of light exceeds 100. The line L1 continues rising up along with the line L4 for the secondary digital image signal and reaches saturation with the quantity of light of 400, with which the line L4 becomes saturated. In this way, a dynamic range D1 for the synthetic digital image signal is also four times as wide as the dynamic range D2 for the conventional digital image signal or the dynamic range D3 for the primary digital image signal.

As described above with reference to FIG. 6, according to this embodiment, the object image can be represented with a dynamic range about four times as wide as conventional ones by the synthetic digital image signal obtained by synthesizing the primary digital image signal from the primary CCD section 34a shown in FIG. 3 and the secondary digital image signal.

Now, there will be described a procedure from the selection by the selector section 36 shown in FIG. 3 to the addition of information by the information adding section 58 shown in FIG. 3.

Figure 7:
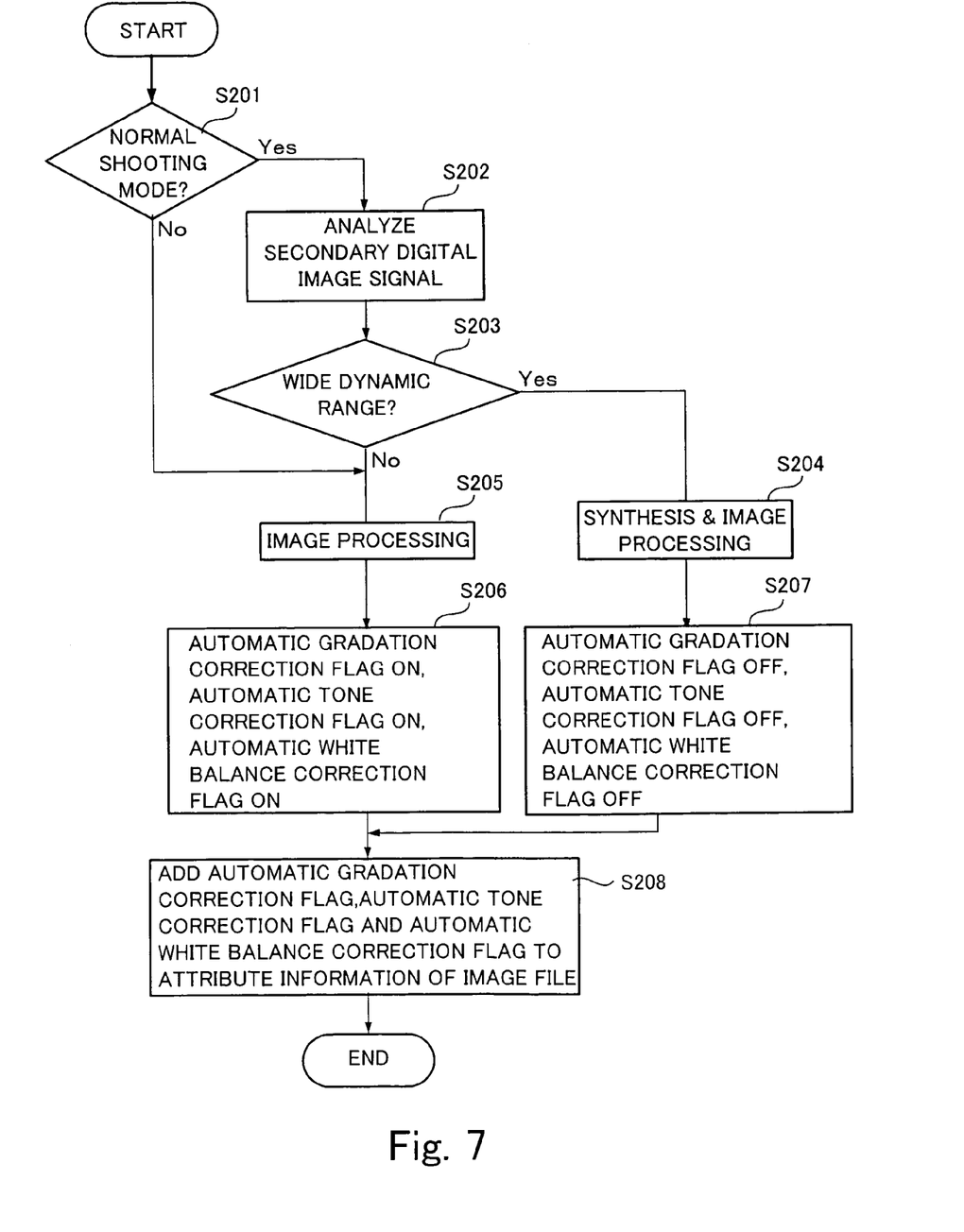
FIG. 7 is a flowchart showing a selection processing in a selector section shown in FIG. 3 and an information adding processing in an information adding section.

FIG. 7 is a flowchart showing a procedure from the selection by the selector section 36 shown in FIG. 3 to the addition of information by the information adding section 58 shown in FIG. 3.

The procedure shown in the flowchart in FIG. 7 starts when the user presses down the release switch 14 shown in FIG. 3.

First, it is determined whether the mode dial 22 shown in FIG. 3 is set at the normal shooting mode or another shooting mode, such as the sequential shooting mode, (step S201).

Here, as described above, besides the normal shooting mode, the digital camera 10 according to this embodiment shown in FIG. 3 can be set, with the mode dial 22, at the sequential shooting mode, the long shutter mode or the sensitive shooting mode. In the case where these shooting modes are selected, the image data should not be produced based on both the primary digital image signal and the secondary digital image signal obtained by both the primary pixels of the primary CCD section 34*a* and the secondary pixels of the secondary CCD section 34*b* shown in FIG. 3 receiving the object light.

First, in the sequential shooting mode, it is necessary to produce image data quickly. However, the synthesis processing (step S105) of the primary and secondary digital image signals in the image signal processing shown in FIG. 5 takes time, and thus, including the synthesis processing (step S105) in the image data production is not suitable for the sequential shooting mode.

Second, in the long shutter mode, the composite CCD 34 is exposed to the object light continuously for a long time. As described above with reference to the graph shown in FIG. 6, the secondary CCD section 34*b* of the composite CCD 34 has a lower sensitivity than the primary CCD section 34*a* and is accordingly less tolerant of noise. In the long shutter mode, since the secondary CCD section 34*b* is exposed to the object light for a long time, more noise occurs in the secondary CCD section 34*b*, and therefore, there is a possibility that the analog image signal from the secondary CCD section 34*b* is buried in the noise. Thus, image data production based on both the image signal from the primary CCD section 34*a* and the image signal from the secondary CCD section 34*b* is not suitable for the long shutter mode.

Finally, in the sensitive shooting mode, the quantity of object light is small, so that there is a possibility that the secondary CCD section 34*b*, which is less sensitive, cannot adequately capture the object light. Therefore, as with the two shooting modes described above, image data production based on both the image signal from the primary CCD section 34*a* and the image signal from the secondary CCD section 34*b* is not suitable for the sensitive shooting mode.

Thus, according to this embodiment, the selector section 36 shown in FIG. 3 determines whether the current shooting mode is the normal shooting mode or not, and if it is determined that the current shooting mode is a shooting mode other than the normal shooting mode, the first mode is selected so that only the primary CCD section 34*a* receive the object light to generate the primary image signal. This determination processing in the selector section 36 corresponds to the determination processing in step S201 in the flowchart shown in FIG. 7.

In the determination processing in step S201, if it is determined that the mode dial 22 is set at the normal shooting mode ("Yes" in step S201), the secondary digital image signals for the current photographing generated by the secondary pixels of the secondary CCD section 34*b* receiving the object light is analyzed as described below (step S202) That is, of the plural signals corresponding to the individual secondary pixels that constitute the secondary digital image signals, the signals exceeding a predetermined threshold level are counted. According to this embodiment, the threshold corresponds to the level of the signal that is output by a secondary pixel when the secondary pixel receives the light in a quantity of 100 indicated on the horizontal axis of the graph shown in FIG. 6. Then, it is determined whether the number of signals obtained in step S202 exceeds a predetermined number or not (step S203). Here, if the number of signals exceeds the predetermine number, it means that the current photographed scene is a scene of a wide dynamic range. The steps S202 and S203 are performed in the determination section 59 shown in FIG. 3.

In the determination processing in step S203, if it is determined that the number of signals exceeds the predetermined number, that is, the current photographed scene is a scene of a wide dynamic range ("Yes" in step S203) the image signal processing circuit 39 shown in FIG. 3 synthesizes the secondary digital image signals generated by the secondary pixels of the secondary CCD section 34*b* receiving the object light and the primary digital image signals generated by the primary pixels of the primary CCD section 34*a* receiving the object light to produce synthetic digital signals, and performs a predetermined image processing on the synthetic image signals, thereby completing the image data representing the object image of the current photographed scene (step S204). In this case, furthermore, as correction inhibiting information that automatic gradation correction, automatic tone correction and automatic white balance correction of the image data are inhibited, an automatic gradation correction flag, an automatic tone correction flag and an automatic white balance correction flag, which are turned off, are generated (step S207).

In the determination processing in step S203, if it is determined that the number of signals is equal to or less than the predetermined number, that is, the current photographed scene is not a scene of a wide dynamic range ("No" in step S203), the image signal processing circuit 39 shown in FIG. 3 performs a predetermined image processing on the primary digital image signals generated by the primary pixels of the primary CCD section 34*a* receiving the object light. Thereby completing the image data representing the object image of the current photographed scene (step S205) In this case, furthermore, as correction permitting information that automatic gradation correction, automatic tone correction and automatic white balance correction of the image data are permitted, an automatic gradation correction flag, an automatic tone correction flag and an automatic white balance correction flag, which are turned on, are generated (step S206).

Then, the image data completed in step S204 is compressed in the compression circuit 40, and the automatic gradation correction flag, the automatic tone correction flag and the automatic white balance correction flag that are turned off in step S207 are added to the resulting compressed image data (step S208). Or, to the compressed image data produced through step S205, the automatic gradation correction flag, the automatic tone correction flag and the automatic white balance correction flag that are turned on in step S206 are added to the resulting compressed image data (step S208). Strictly speaking, these flags are added to the compressed image data by adding the flags to attribute information that indicates the attribute of the object image represented by the compressed image data.

As described above, the image data produced in step S204 represents an object image of a scene of a wide dynamic range. Therefore, for example, if the automatic gradation correction, the automatic tone correction, the automatic white balance correction or the like is performed in printing in a photo printing shop, the wide dynamic range of the image data may not be reflected in the print, for example, the gradation may be obscured in bright areas of the image. Thus, according to this embodiment, the automatic gradation correction flag, the automatic tone correction flag and the automatic white balance correction flag that are turned off are generated in step S207. If these flags are input, along with the image data, to the printer or the like in the photo printing shop, the printer inhibits the corrections described above complying with the flags. In this way, the printer can effectively use rich image data representing an image of a wide dynamic range to produce a photographic print.

As described above, as is conventional, the image data produced in step S205 represents an object image of a scene of a dynamic range corresponding to the value 100 on the horizontal axis of the graph in FIG. 6. Therefore, the automatic gradation correction, the automatic tone correction, the automatic white balance correction or the like can be performed on the image data in printing in a photo printing shop. Thus, according to this embodiment, the automatic gradation correction flag, the automatic tone correction flag and the automatic white balance correction flag that are turned on are generated in step S206. If these flags are input, along with the image data, to the printer or the like in the photo printing shop, the printer performs the corrections described above complying with the flags.

As described above, the digital camera 10 shown in FIG. 3 adds the automatic gradation correction flag, the automatic tone correction flag and the automatic white balance correction flag to the compressed image data obtained by compressing the image data representing the object image. Here, the image data to which these flags are attached will be referred to as an image file, hereinafter.

Figure 8:
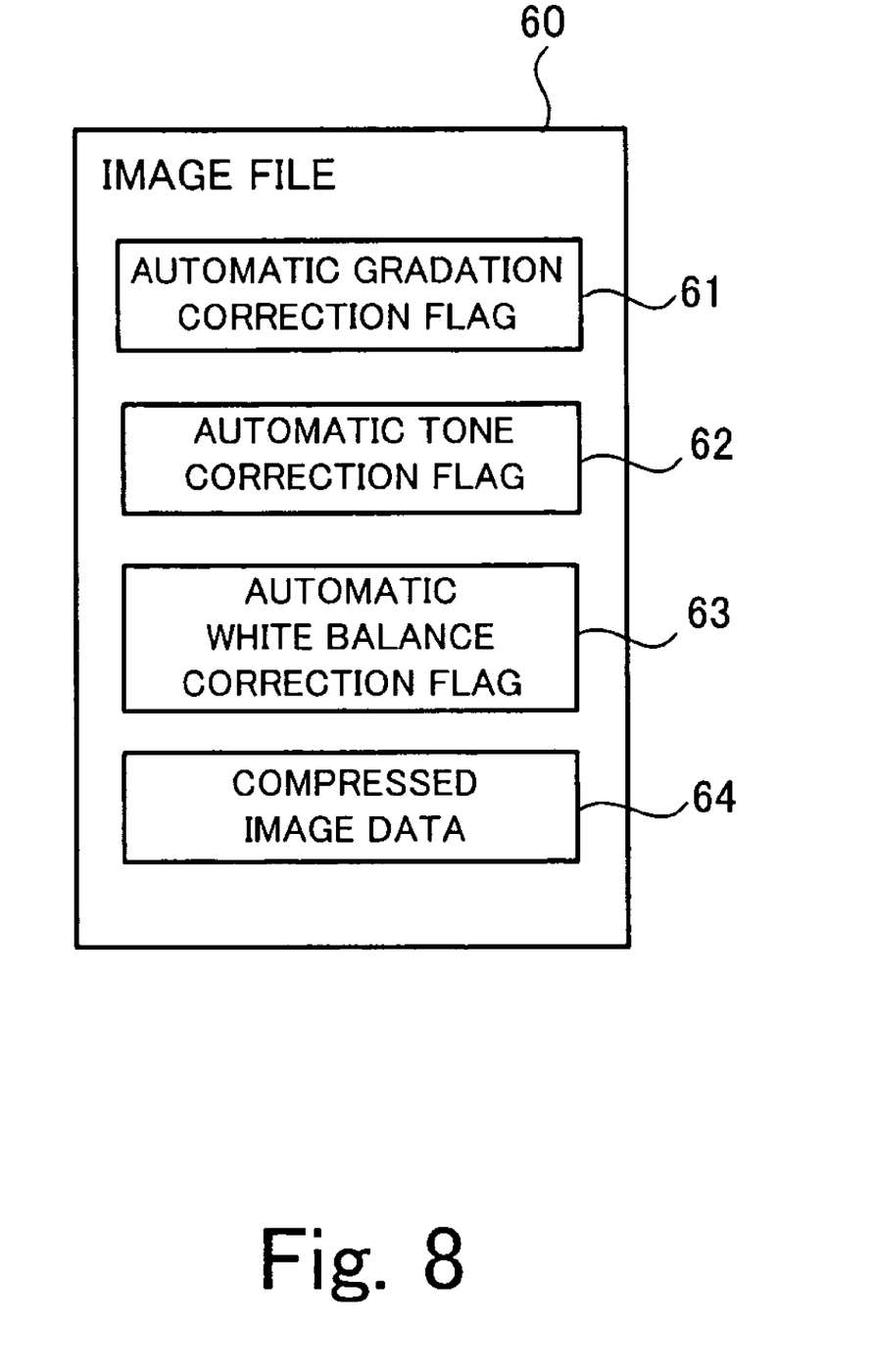
FIG. 8 is a schematic diagram showing an image file produced in the digital camera.

FIG. 8 is a schematic diagram showing an image file produced in the digital camera.

FIG. 8 shows an image file 60 composed of compressed image data 64 obtained by compressing image data, and an automatic gradation correction flag 61, an automatic tone correction flag 62 and an automatic white balance correction flag 63 attached to the compressed image data. As described above, if the compressed image data 64 is rich data representing an object image of a scene of a wide dynamic range, the automatic gradation correction flag 61, the automatic tone correction flag 62 and the automatic white balance correction flag 63 are turned off, and the automatic gradation correction, the automatic tone correction and the automatic white balance correction of the compressed image data 64 are inhibited. Alternatively, if the compressed image data 64 represents an object image of a scene of a conventional dynamic range, the automatic gradation correction flag 61, the automatic tone correction flag 62 and the automatic white balance correction flag 63 are turned on, and the automatic gradation correction, the automatic tone correction and the automatic white balance correction of the compressed image data 64 are permitted.

In the photo printing shop or the like, if the recording medium 54 shown in FIG. 3 storing the image file 60 shown in FIG. 8 is received from the user, the recording medium 54 is installed in a reader unit in the printer or the like. The printer reads the compressed image data 64 and the flags 61, 62 and 63 by means of the reader unit. Then, depending on whether the flags 61, 62 and 63 are turned on or off, it is determined whether to perform the automatic gradation correction, the automatic tone correction and the automatic white balance correction of the compressed image data 64.

In this way, the user can get a high-quality picture of the object image of the scene of a wide dynamic range in which the high performance of the digital camera 10 shown in FIG. 3 is adequately reflected.

In the above description, as the additional information added to the image data by the information adding section, the automatic gradation correction flag 61, the automatic tone correction flag 62 and the automatic white balance correction flag 63 are taken as an example. However, the present invention is not limited to the additional information described above. Some printers can perform only the automatic gradation correction or only the automatic tone correction and automatic white balance correction. In the case where such a printer is used, the additional information may include only the automatic gradation correction flag or only the automatic tone correction flag and automatic white balance correction flag.

In addition, the additional information added to the image data by the information adding section according to the present invention may be scene attribute information that the image data is produced based on the synthetic digital image signals, that is, the current photographed scene is a scene of a wide dynamic range. In this case, for example, the printer used for printing the picture is of a type that performs appropriate processings including printing by inhibiting the corrections described above in accordance with the scene attribute information.

Figure 9:
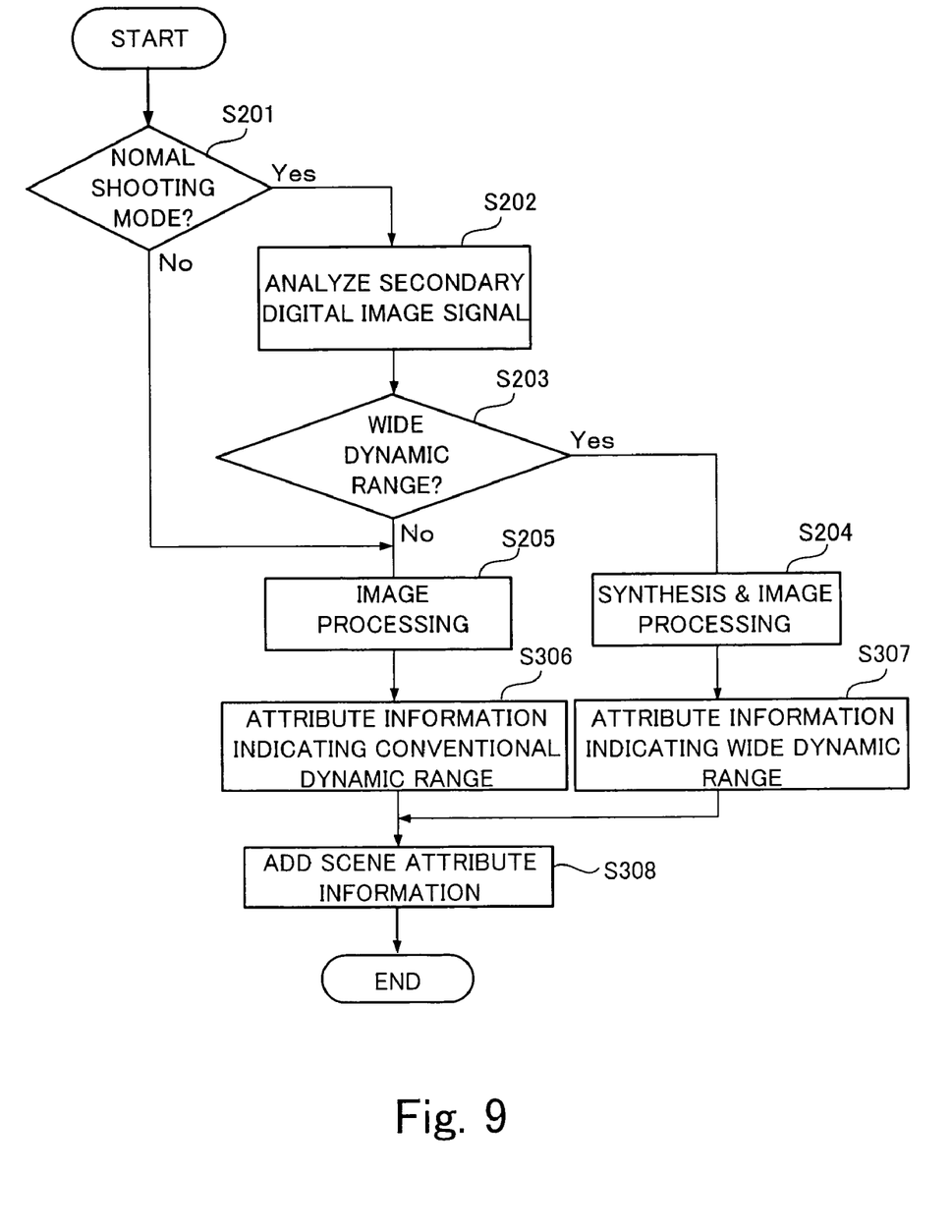
FIG. 9 is a flowchart showing a process of adding, to image data, scene attribute information that indicates whether the dynamic range of an image signal is wide or narrow, instead of flags shown in FIG. 7.

FIG. 9 is a flowchart showing a process of adding, to image data, scene attribute information that indicates the dynamic range of the image data is wide or narrow, instead of the flags shown in FIG. 7.

In FIG. 9, the steps other than steps S306 to S308 are the same as the steps S201 to S205 shown in FIG. 7 and assigned the same reference numerals. The steps S201 to S205 in FIG. 9 will not be redundantly described in the following.

In the flowchart shown in FIG. 9, if image data representing an object image of a scene of a wide dynamic range is produced in the digital camera 10 shown in FIG. 3 (if it is determined "Yes" in step S203), instead of generation of the flags turned off shown in FIG. 7 (step S207), scene attribute information indicating a wide dynamic range is produced (step S307). Alternatively, if image data representing an object image of a scene of a conventional dynamic range is produced in the digital camera 10 shown in FIG. 3 (if it is determined "No" in step S203), instead of generation of the flags turned on shown in FIG. 7 (step S206), scene attribute information indicating a conventional dynamic range is produced (step S306). Then, the scene attribute information produced in step S306 or S307 is added to the compressed image data to produce an image file (step S308).

Figure 10:
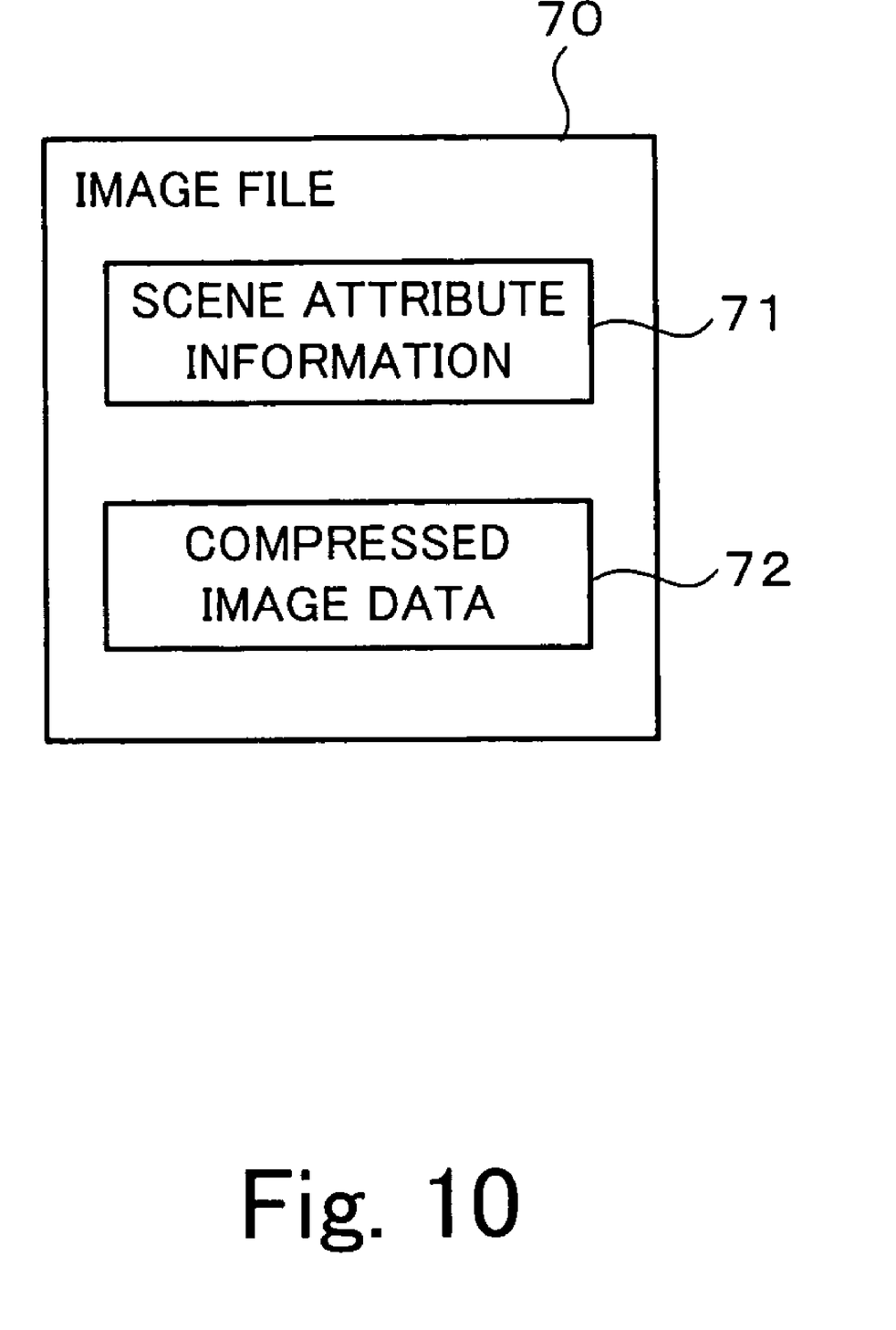
FIG. 10 is a schematic diagram showing an image file composed of scene attribute information and compressed image data.

FIG. 10 is a schematic diagram showing an image file composed of scene attribute information and compressed image data.

An image file 70 shown in FIG. 10 is produced through the flowchart shown in FIG. 9 and is composed of scene attribute information 71 and compressed image data 72. If the scene attribute information 71 in the image file 70 indicates that the image data represents an image of a wide dynamic range, the printer having received the image file performs an appropriate processing to effectively use the rich data, such as printing with the corrections being inhibited in accordance with the scene attribute information 71.

As a result, the user can get a picture in which the high performance of the digital camera 10 shown in FIG. 3 is adequately reflected.

In the description of this embodiment, the digital camera is taken as an example of the image taking apparatus according to the present invention. However, the image taking apparatus according to the present invention is not limited thereto, and the present invention can be applied to a camera-equipped cellular phone or the like which has been popular.

What is claimed is:

1. An image taking apparatus, comprising:

an image-taking optical system that focuses object light from an object to form an image;

a primary image pick-up section that receives a predetermined first part of the object light focused by the image-taking optical system to produce a primary image signal;

a secondary image pick-up section that has a dynamic range wider than that of the primary image pick-up section and receives a second part of the object light excluding the first part to produce a secondary image signal;

an image signal synthesizing section that synthesizes the primary image signal and the secondary image signal to produce a synthetic signal;

a selector section that selects any one of the primary image signal and the synthetic signal;

an image data producing section that produces image data representing an image of the object based on the primary image signal if the selector section selects the primary image signal or produces image data representing an image of the object based on the synthetic signal if the selector section selects the synthetic signal; and an information adding section that adds predetermined additional information to the image data if the selector section selects the synthetic signal.

2. The image taking apparatus according to claim 1, wherein the additional information added to the image data by the information adding section is correction inhibiting information that indicates that a predetermined image correction of the image data is inhibited.

3. The image taking apparatus according to claim 1, wherein the additional information added to the image data by the information adding section is attribute information that indicates that the image data is image data produced based on the synthetic signal.

* * * * *